(12) United States Patent
Iwamoto et al.

(10) Patent No.: US 9,207,500 B2
(45) Date of Patent: Dec. 8, 2015

(54) LIQUID CRYSTAL DISPLAY APPARATUS

(71) Applicant: STANLEY ELECTRIC CO., LTD., Meguro-ku, Tokyo (JP)

(72) Inventors: Yoshihisa Iwamoto, Tokyo (JP); Makoto Kobayashi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/448,776

(22) Filed: Jul. 31, 2014

(65) Prior Publication Data
US 2015/0055076 A1 Feb. 26, 2015

(30) Foreign Application Priority Data
Aug. 22, 2013 (JP) .................................. 2013-172511

(51) Int. Cl.
G02F 1/1343 (2006.01)
G02F 1/1337 (2006.01)
G02F 1/1333 (2006.01)

(52) U.S. Cl.
CPC .... *G02F 1/134309* (2013.01); *G02F 1/133707* (2013.01); *G02F 1/134327* (2013.01); *G02F 2001/133374* (2013.01)

(58) Field of Classification Search
CPC .................. G01F 1/133707; G01F 1/134327; G02F 2001/13374
USPC ............................. 349/39, 141, 142, 147, 84
See application file for complete search history.

(56) References Cited

U.S. PATENT DOCUMENTS

| 6,816,223 | B2 | 11/2004 | Sugiyama et al. |
| 7,714,968 | B2 | 5/2010 | Iwamoto |
| 8,593,607 | B2 | 11/2013 | Soda |
| 2012/0069284 | A1 | 3/2012 | Soda |
| 2012/0075561 | A1 | 3/2012 | Iwamoto et al. |

FOREIGN PATENT DOCUMENTS

| CN | 101477280 A | 7/2009 |
| EP | 2431797 A1 | 3/2012 |
| JP | 4107978 B2 | 6/2008 |
| JP | 4846402 B2 | 12/2011 |
| JP | 4884176 B2 | 2/2012 |
| JP | 2012063711 A | 3/2012 |

OTHER PUBLICATIONS

Extended European Search Report dated Dec. 22, 2014, issued in counterpart European Application No. 14181777.5.

*Primary Examiner* — Vip Patel
(74) *Attorney, Agent, or Firm* — Holtz, Holtz, Goodman & Chick PC

(57) ABSTRACT

To provide a segment display-type liquid crystal display apparatus that readily prevents display flaws caused by disconnection. The apparatus displays a predetermined pattern shape, comprising a first and a second electrode disposed so that a portion of each overlaps, and a liquid crystal layer disposed between the electrodes. The first electrode comprises hollow parts open in accordance with the pattern shape, and a plurality of first openings, each having a first area extending in a first direction. The region where the electrodes overlap is divided into a first region demarcated by a portion of a contour of a hollow part and a first boundary part wherein the distance in the first direction between contours of a hollow part is 1.5 times the length of the first area, and a second region other than the first region, and the plurality of first openings is disposed correspondingly in the first region.

12 Claims, 20 Drawing Sheets

US 9,207,500 B2

LIQUID CRYSTAL DISPLAY APPARATUS

BACKGROUND OF THE INVENTION

1. Field of the Invention

The present invention relates to a segment display-type liquid crystal display apparatus.

2. Description of the Background Art

A liquid crystal display apparatus is broadly used as an information display unit in various electronic devices for consumer or automobile use. In General, a liquid crystal display apparatus is configured by disposing a liquid crystal layer made of a liquid crystal material between two substrates that are placed opposite each other with a gap of roughly several micrometers. To obtain favorable viewing angle dependency even when voltage is applied in such a liquid crystal display apparatus, it is effective to use a multi-domain orientation which ensures that the orientation direction of the liquid crystal molecules will be separated into a plurality of directions in a single pixel.

With regard to multi-domain orientation techniques, Japanese Patent No. 4107978 (Patent Document 1), for example, discloses a technique for realizing a multi-domain orientation that comprises two orientation directions by generating two diagonal electric fields in directions that differ from each other by 180° inside the liquid crystal layer by providing a plurality of openings to the electrodes, and orientating the liquid crystal molecules along such electric field directions. Further, for example, Japanese Patent No. 4846402 (Patent Document 2) and Japanese Patent No. 4884176 (Patent Document 3) disclose techniques for realizing a multi-domain orientation that comprises four orientation directions by refining the shapes of a plurality of openings provided to the electrodes. Furthermore, for example, Chinese Unexamined Patent Application Publication No. 101477280 (Patent Document 4) and Japanese Unexamined Patent Application Publication No. 2012-63711 (Patent Document 5) also disclose orientation control techniques for orientating liquid crystal molecules in all directions without limiting the orientation directions to a distinct plurality of directions by refining the shapes of a plurality of openings. In each of these orientation control techniques, the plurality of openings provided to the electrodes in order to control the electrical field directions serves as a critical technical element.

However, in a liquid crystal display apparatus that executes a display (a so-called reverse display) which facilitates visual recognition of a pattern section by changing the transmittance in the vicinity of the pattern displayed, due to the complexity of the pattern, there are locations where the width of a section that separates sections (outline patterns) in which the electrodes are open in accordance with the pattern becomes narrow. For example, such a location may occur in a case where characters that make up a complex kanjis (Chinese characters used in Japanese writing) serve as the pattern. If such a plurality of openings as described above is provided to electrodes having such a plurality of outline patterns, an opening may cut across a section that separates outline patterns, thereby causing disconnection in the electrode and, as a result, display flaws. While, in response, the longitudinal-direction length of the respective openings may conceivably be set smaller than the width of the section that separates the outline patterns, in a case where the difference between the longitudinal-direction length and the width of the section that separates the outline patterns is not significantly large, the same inconvenience occurs due to the formation precision of etching and the like.

On the other hand, while the problem may also be conceivably resolved by dividing the outline patterns between one electrode and the other electrode in a well-balanced manner, in such a case, high accuracy is required in the positioning of the electrodes to ensure that the pattern displayed is not destroyed, making it difficult for such a technique to serve as a realistic solution in consideration of manufacturing yield and the like.

SUMMARY OF THE INVENTION

It is therefore an object of the specific aspects according to the present invention to provide a segment display-type liquid crystal display apparatus with a structure that readily prevents display flaws caused by disconnection.

The liquid crystal display apparatus of an aspect according to the present invention is a segment display-type liquid crystal display apparatus that displays a predetermined pattern, comprising (a) a first electrode and a second electrode disposed so that at least a portion of each overlaps in the planar view, and (b) a liquid crystal layer disposed between the first electrode and the second electrode, wherein: (c) the first electrode comprises one or more hollow parts open in accordance with a pattern shape, and a plurality of first openings, each having at least a first area that extends in a first direction, (d) the region where the first electrode and the second electrode overlap is divided into a first region demarcated by at least a portion of a contour of a hollow part and a first boundary part wherein the distance in the first direction between contours of a hollow part is 1.5 times or less the length of the first area, and a second region other than the first region, and (e) the plurality of first openings is disposed correspondingly in the first region and not disposed in the second region.

According to the foregoing configuration, a segment display-type liquid crystal display apparatus with a structure that readily prevents display flaws caused by disconnection can be achieved.

Preferably, in the liquid crystal display apparatus described above, the first electrode further comprises a plurality of second openings, each having at least a second area that extends in a second direction that crosses the first direction; the first region is demarcated by a first boundary part and a second boundary part wherein the distance in the second direction between contours of a hollow part is 1.5 times or less the length of the second area, and at least a portion of a contour of a hollow part; and the plurality of second openings is disposed correspondingly in the first region and not disposed in the second region.

Further, preferably, in the liquid crystal display apparatus described above, the second electrode comprises a plurality of third openings, and the plurality of third openings is correspondingly disposed in the second region and not disposed in the first region.

Further, preferably, in the liquid crystal display apparatus described above, the plurality of third openings has the same shape as that of the plurality of first openings or the plurality of second openings.

Further, preferably, in the liquid crystal display apparatus described above, the first electrode further comprises a plurality of fourth openings, each with a length in the first direction that is shorter than that of the first area, and the plurality of fourth openings is correspondingly disposed in the first region and not disposed in the second region.

DESCRIPTION OF THE PREFERRED EMBODIMENTS

Now, an embodiment of the present invention will be described below with reference to the accompanying drawings. Note that the term "segment display-type" in this description refers to a type which is configured to directly form a pattern of characters, designs, and the like to be displayed in a region where the electrodes overlap, basically capable of only displaying a display pattern of predetermined characters and the like, and in which an area of about 50% or less based on an area ratio in the effective display region of the liquid crystal display apparatus contributes to the display of characters and the like. Based on this point, this type differs from a dot matrix display type wherein several of a plurality of pixels regularly arranged and having substantially the same shape can be suitably combined to freely form various characters and the like.

Figure 1:
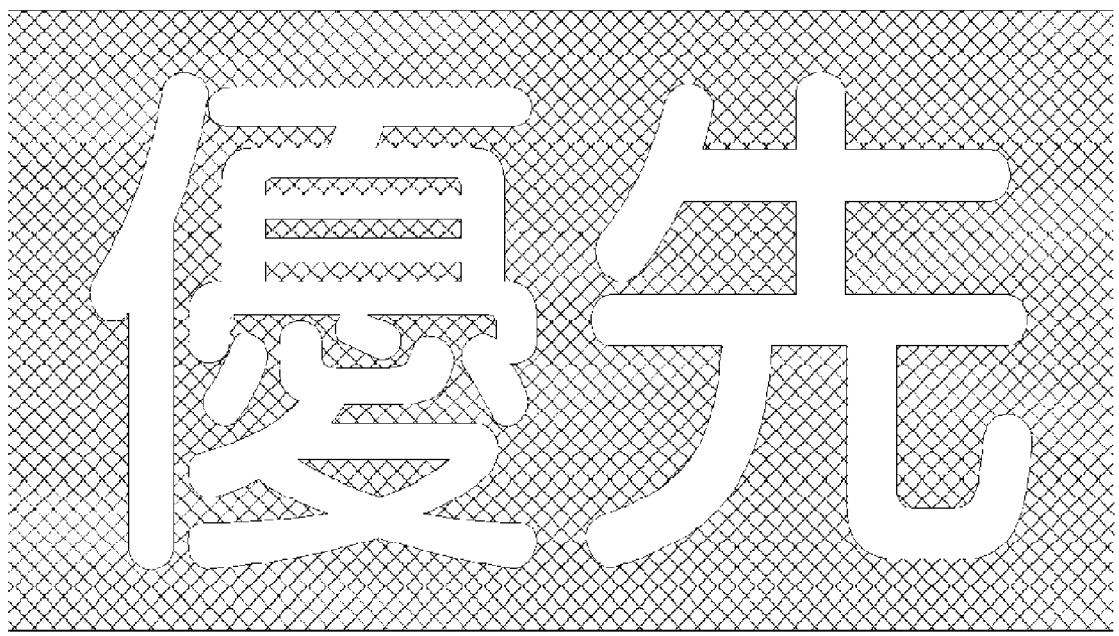
FIG. 1 is a planar view showing a display example of characters formed by a segment electrode and a common electrode of a liquid crystal display apparatus.

Basic Principle:

FIG. 1 is a planar view showing a display example of characters formed by a segment electrode and a common electrode of a liquid crystal display apparatus. FIG. 1 shows the electrode pattern that carries out a reverse display of the Chinese characters "優先" (pronounciation: [ju:sen], meaning: priority) in an 8 mm×4.5 mm rectangular region as an example. Here, the term "reverse display" refers to a display in which the light and dark states of sections (the shaded sections in the figure) other than the sections of the characters "優先" can be switched by electrical switching, making the sections of the characters visually pop out. Note that the structure of the liquid crystal display apparatus is the same as each of the preceding examples described above or as that shown in FIG. 5 described later.

Figure 2A:
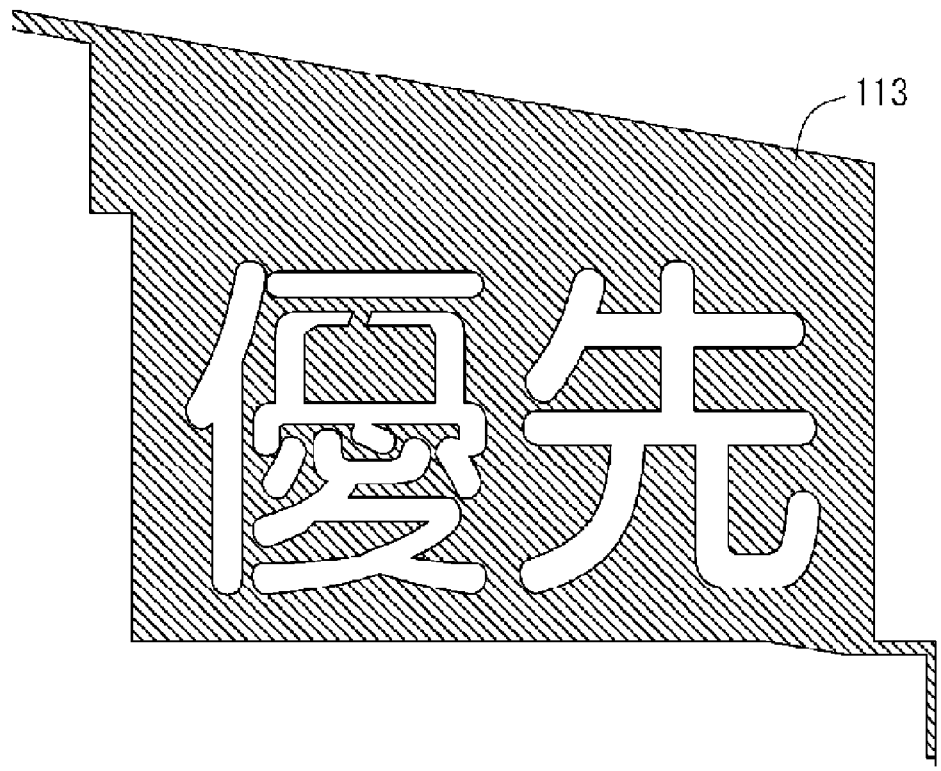
FIG. 2A is a planar view showing an example of the structure of the segment electrode.
Figure 2B:
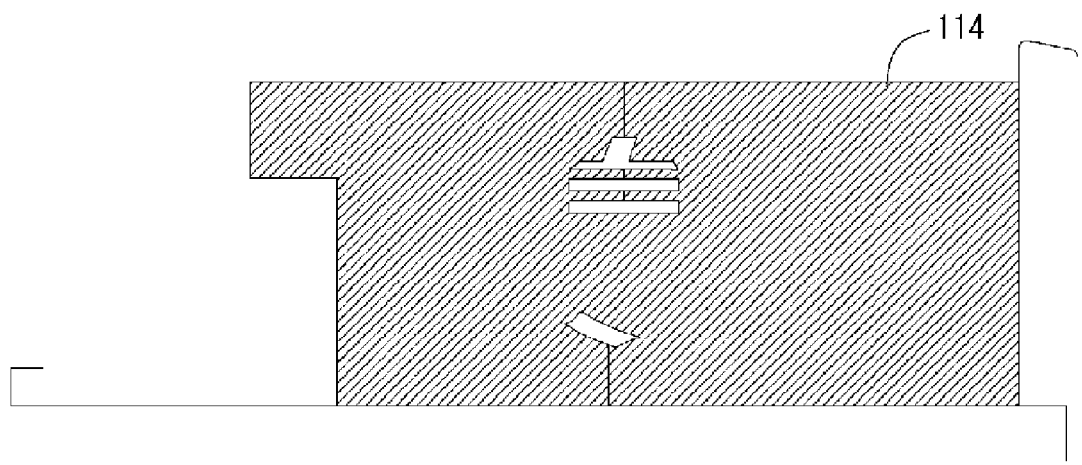
FIG. 2B is a planar view showing an example of the structure of the common electrode.

FIG. 2A is a planar view showing an example of the structure of the segment electrode, and FIG. 2B is a planar view showing an example of the structure of the common electrode. As shown, a greater part of the characters "優先" is formed into a pattern by a segment electrode 113 (refer to FIG. 2A), and the remaining part (so-called floating island pattern section) is formed into a pattern by a common electrode 114 (refer to FIG. 2B). This is a creative approach used to prevent significant destruction of the "優先" display shape if a position shift occurs when the respective substrates, to which the segment electrode 113 and the common electrode 114 are provided, are overlapped.

Figure 3A:
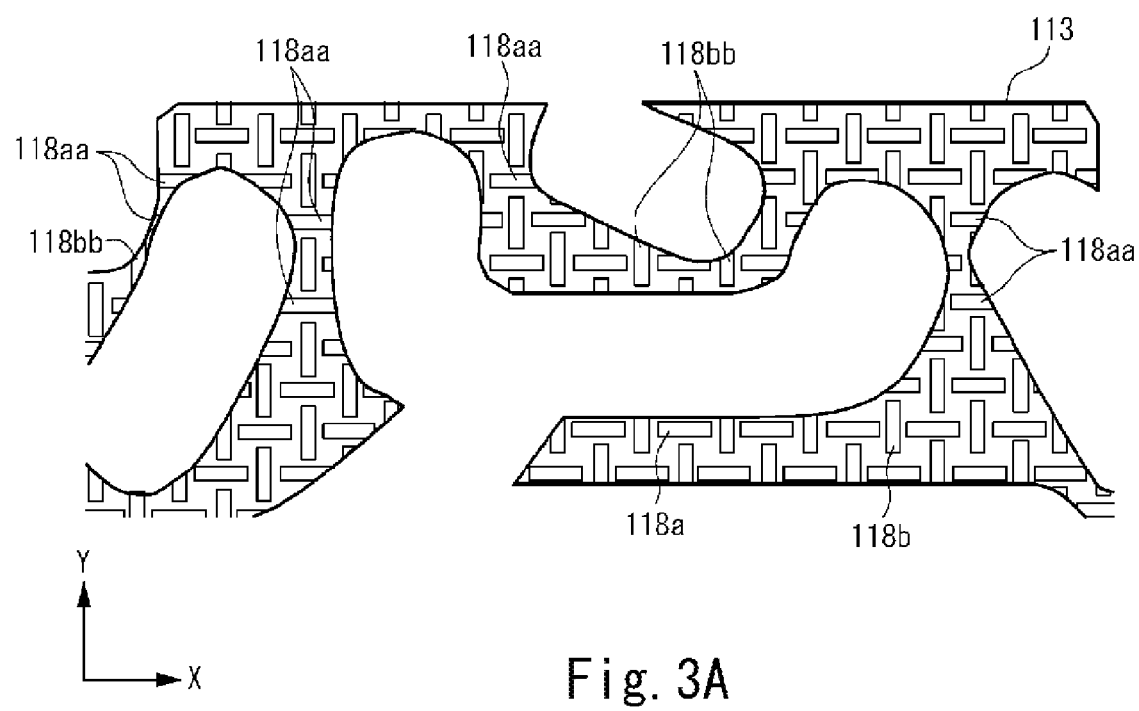
FIG. 3A and FIG. 3B are each an enlarged planar view partially showing the segment electrode.
Figure 3B:
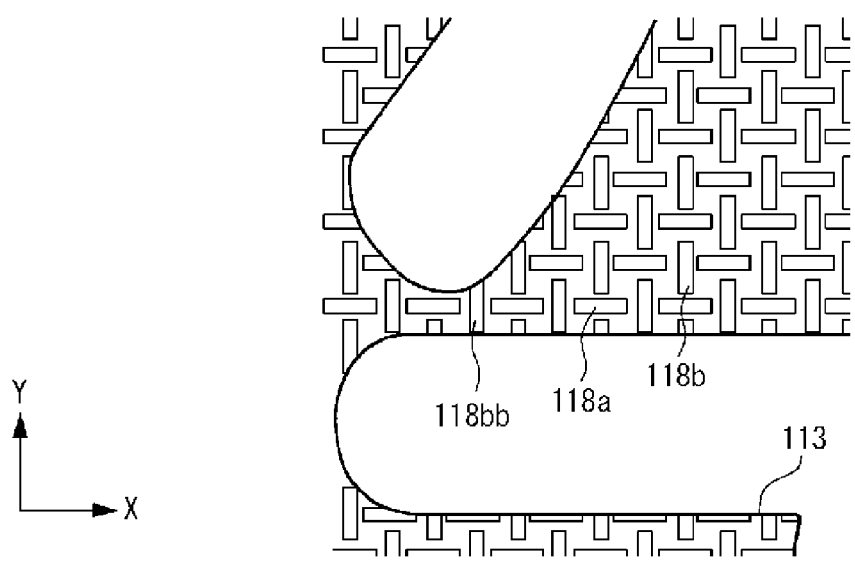

FIG. 3A and FIG. 3B are each an enlarged planar view partially showing the segment electrode. Here is considered a case where a plurality of rectangular openings long in one direction is provided to the segment electrode 113 and the common electrode 114, respectively. Specifically, as shown in each figure, the illustrated scenario presumes a case where a plurality of openings 118a with a shape that extends in a direction X (a left-right direction in the figures) and a plurality of openings 118b with a shape that extends in a direction Y (the up-down direction in the figures) are provided to the segment electrode 113. At this time, if the width in the direction X of a section of the segment electrode 113 is less than or equal to the longitudinal-direction length of the respective openings 118a, disposing one of the openings 118a in that section may result in disconnection. Further, if the longitudinal-direction length becomes greater than the design value due to the circumstances of formation precision of the respective openings 118a, disconnection may still occur in a case where the width in the direction X of a section of the segment electrode 113 is close to the longitudinal-direction length, even if the width thereof is greater than or equal to the longitudinal-direction length of the respective openings 118a. The respective openings susceptible to disconnection are denoted as "openings 118aa" in the figures. Based on these same reasons, if the width in the direction Y of a section of the segment electrode 113 is close to the longitudinal-direction length of the respective openings 118b, whether less than, greater than, or equal to the longitudinal-direction length, disconnection may occur by means of any of the openings 118b. The respective openings susceptible to disconnection are denoted as "openings 118bb" in the figures. Note that, in this example, there is no particularly narrow location in the common electrode 114 and thus no location where disconnection will occur therein, even if the respective openings are disposed. Accordingly, an illustration thereof is omitted.

Figure 4A:
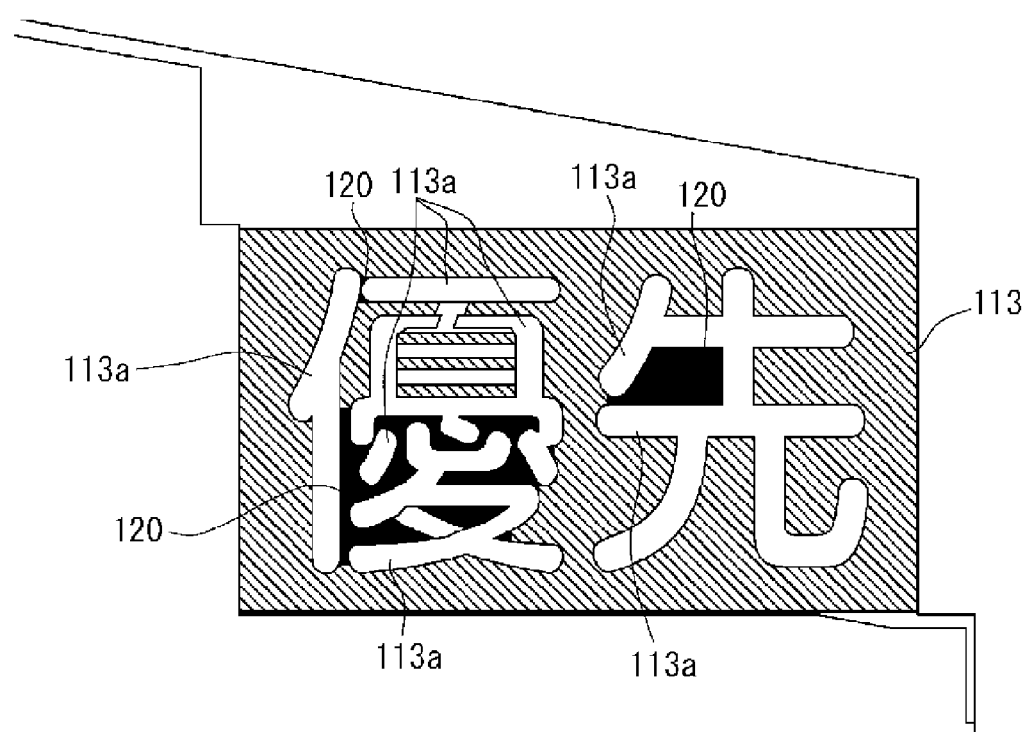
FIG. 4A is a planar view for explaining regions susceptible to display flaws caused by disconnection in the segment electrode.
Figure 4B:
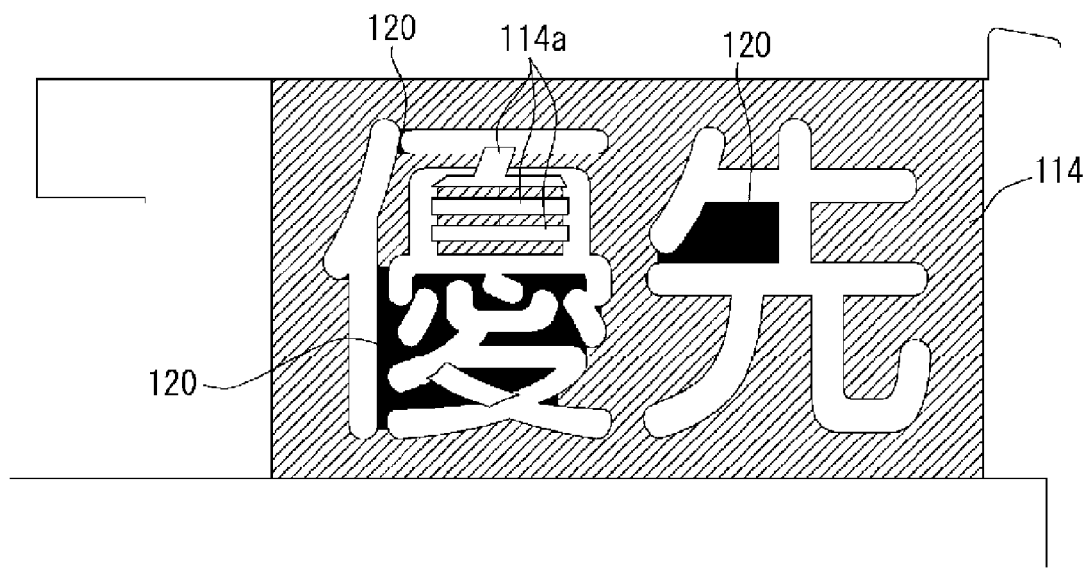
FIG. 4B shows the island-shaped sections of the common electrode.

FIG. 4A is a planar view for explaining regions susceptible to display flaws caused by disconnection in the segment electrode. In a case where each of a plurality of the openings 118a and 118b is regularly disposed on the segment electrode 113 as described above, display flaw susceptible regions 120 (the black regions in the figure) occur as shown in FIG. 4A. The respective regions 120 comprise a length that is 1.3 times the longitudinal-direction length (0.1 mm for example) of the respective openings 118 and 119, from the outermost shell of the display part design of the segment electrode 113 toward the inside, and are obtained when a search is conducted from the outermost design shell toward the inside for positions where the distance (that is, electrode width) between respective outline pattern sections (hollow parts) 113a in the up-down/left-right direction parallel with the longitudinal direction of the respective openings 118 and 119 is equivalent thereto. These regions 120 are regions (first regions) demarcated by at least a portion of a contour of the respective outline patterns 113, and a boundary part wherein the distance in the up-down direction or left-right direction between contours of the outline patterns 113a is less than or equal to 1.3 times the longitudinal-direction length of the respective openings 118a and 118b. Note that the sections shaded with lines in FIG. 4A indicate regions where the segment electrode 113 and common electrode 114 are disposed facing each other, and the outline sections are regions where an outline pattern exists on at least one of the electrodes. FIG. 4B shows the island-shaped sections of the common electrode. A location where the distance between outline patterns 114a is 1.3 times the longitudinal-direction length of the respective openings provided to the common electrode 114 does not exist on the common electrode 114 in this example. Accordingly, the island-shaped sections are set in the same positions as those of the segment electrode 113.

From the above, prevention of display flaws is conceivably possible if the disposed states of the respective openings are made to differ between the display flaw susceptible regions (first regions) 120 and other regions (second regions). The following describes various embodiments based on this basic principle. Then, according to the above described technique, it is possible to substantially regularly identify locations susceptible to pattern chipping and thus suppress pattern chipping without conducting investigations by pretesting or the like. If a search for pattern chipping locations can be automatically conducted, the awareness of pattern chipping itself is eliminated. Accordingly, it is possible to achieve a favorable multi-domain orientation without pattern chipping while supporting a finer display pattern. Furthermore, it is possible to create highly reliable CAD data while shortening the verification time of the etching mask design used in pattern formation to reduce the design time.

Embodiment 1

Figure 5:
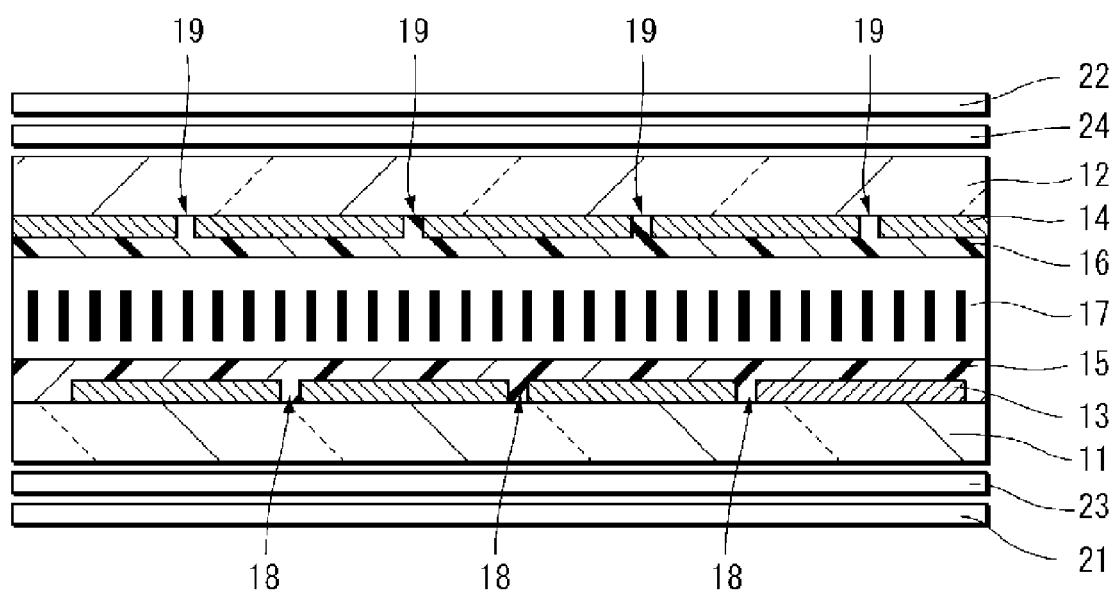
FIG. 5 is a cross-sectional view showing the basic structure of a liquid crystal display apparatus.

FIG. 5 is a cross-sectional view showing the basic structure of a liquid crystal display apparatus. This liquid crystal display apparatus comprises a first substrate 11 and a second substrate 12 disposed facing each other, and a liquid crystal layer 17 disposed between the two substrates as a basic configuration.

The first substrate 11 and the second substrate 12 are each a transparent substrate, such as a glass substrate, plastic substrate, or the like, for example. As shown, the first substrate 11 and the second substrate 12 are bonded together with a predetermined gap (approximately 4 μm, for example) therebetween.

The segment electrode (the first electrode) 13 is provided to one surface side of the first substrate 11. Similarly, the common electrode (the second electrode) 14 is provided to one surface side of the second substrate 12. The segment electrode 13 and the common electrode 14 are each configured by suitably patterning a transparent conductive film, such as indium tin oxide (ITO), for example. The segment electrode 13 and the common electrode 14 are formed so that the regions that overlap form predetermined characters and designs of the segment display part (refer to FIG. 1).

An oriented film 15 is provided to one surface side of the first substrate 11 so as to cover the segment electrode 13. Another oriented film 16 is provided to one surface side of the second substrate 12 so as to cover the common electrode 14. A vertical oriented film that restricts the orientation of the liquid crystal layer 17 to a vertical orientation is used as the oriented film 15 and the oriented film 16. A uniaxial orientation process such as a rubbing process is not performed on either of the oriented films 15 and 16.

The liquid crystal layer 17 is provided between the first substrate 11 and the second substrate 12. In this embodiment, the liquid crystal layer 17 is configured using a liquid crystal material with a negative dielectric constant anisotropy $\Delta\epsilon$. A refractive index anisotropy $\Delta n$ of the liquid crystal material is about 0.1, for example. The bold lines shown in the liquid crystal layer 17 schematically indicate the direction of orientation of the liquid crystal molecules in the liquid crystal layer 17. The liquid crystal layer 17 of this embodiment is set in a vertical orientation in which the direction of orientation of the liquid crystal molecules when a voltage is not applied is vertical with respect to each substrate surface of the first substrate 11 and the second substrate 12.

A plurality of the openings 18 is provided to the segment electrode 13. Similarly, A plurality of the openings 19 is provided to the common electrode 14.

A polarizing plate 21 is disposed on the outside of the first substrate 11. Similarly, a polarizing plate 22 is disposed on the outside of the second substrate 12. The polarizing plate 21 and the polarizing plate 22 are disposed so that the respective absorption axes are substantially orthogonal to each other. Further, an optical compensating plate, such as a C plate, may be suitably disposed between each polarizing plate 21, 22 and each substrate 11, 12. For example, according to this embodiment, optical compensating plates 23 and 24 are disposed between the first substrate 11 and the polarizing plate 21, and between the second substrate 12 and the polarizing plate 22, respectively.

Figure 6A:
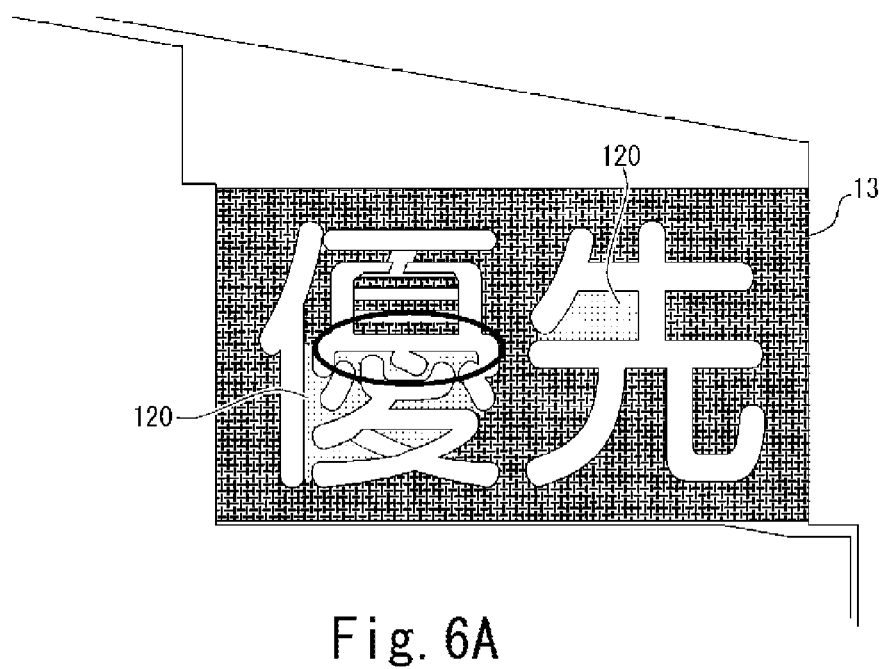
FIG. 6A is a planar view showing the structure of the segment electrode.
Figure 7A:
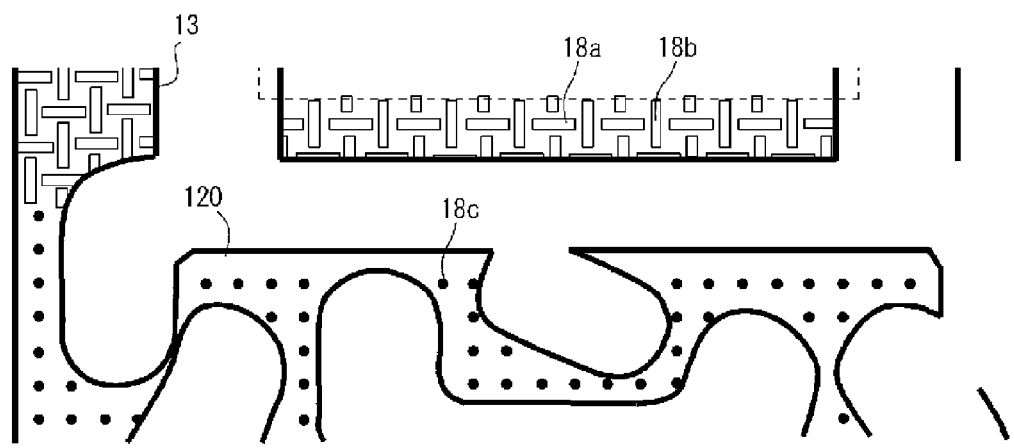
FIG. 7A is an enlarged planar view of the region indicated by an ellipse in FIG. 6A.

FIG. 6A is a planar view showing the structure of the segment electrode. Further, FIG. 7A is an enlarged planar view of the region indicated by an ellipse in FIG. 6A. As shown in the respective figures, a plurality of rectangular openings 18a and 18b is provided to regions other than the display flaw susceptible regions 120 and, in the display flaw susceptible regions 120, a plurality of circular openings 18c is periodically disposed in the respective up-down and left-right directions in the figure instead of the provision of rectangular openings. Note that, among the respective openings 18 provided to the segment electrode 13, the openings with a shape that extends in the direction X in the figure are identified using the reference numeral "18a", the openings with a shape that extends in the Y direction in the figure are identified using the reference numeral "18b", and the circular openings are identified using the reference numeral "18c".

Figure 6B:
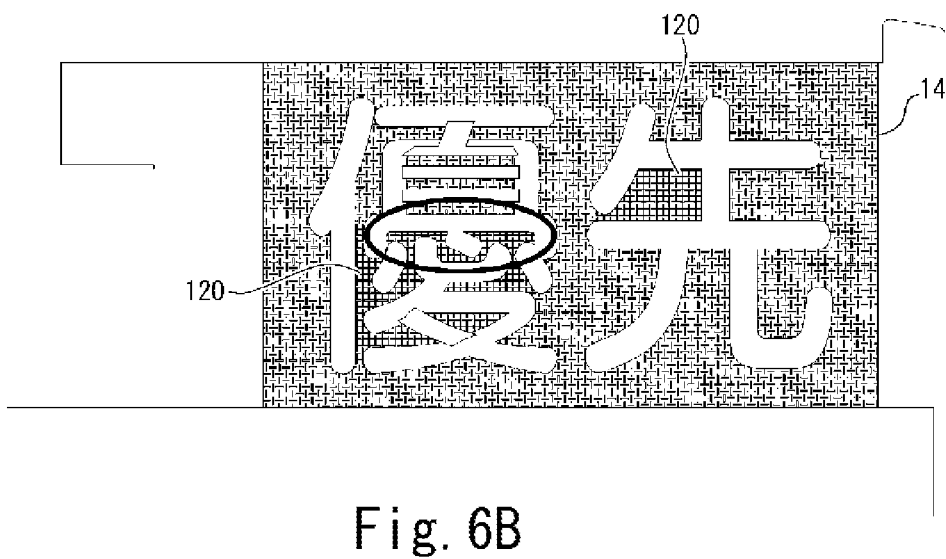
FIG. 6B is a planar view showing the structure of the common electrode.
Figure 7B:
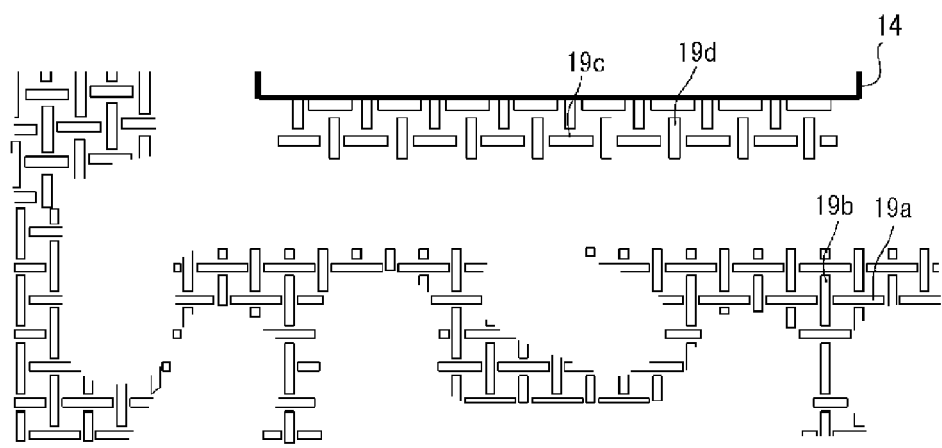
FIG. 7B is an enlarged planar view of the region indicated by an ellipse in FIG. 6B.

FIG. 6B is a planar view showing the structure of the common electrode. Further, FIG. 7B is an enlarged planar view of the region indicated by an ellipse in FIG. 6B. As shown in the respective figures, a plurality of rectangular openings 19a and 19b is provided to the display flaw susceptible regions 120, and the respective openings 19c and 19d that differ in size from the respective openings 19a and 19b described above are provided to regions other than the display flaw susceptible regions 120.

Figure 7C:
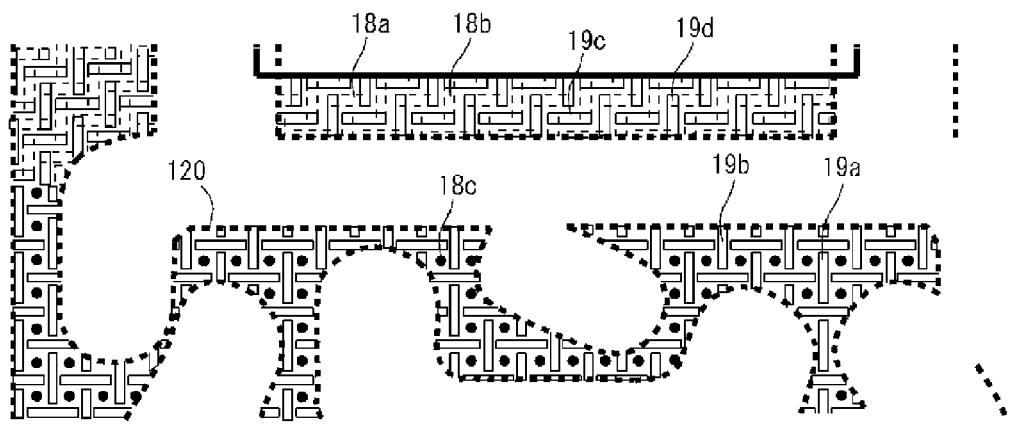
FIG. 7C is an enlarged planar view showing the segment electrode and common electrode superimposed.
Figure 8A:
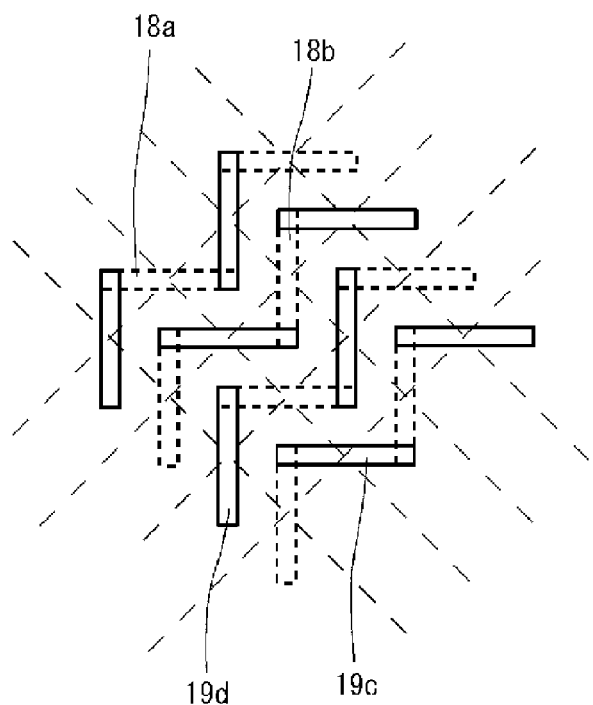
FIG. 8A and FIG. 8B are planar views respectively showing the disposition of the respective openings with the segment electrode and common electrode superimposed.
Figure 8B:
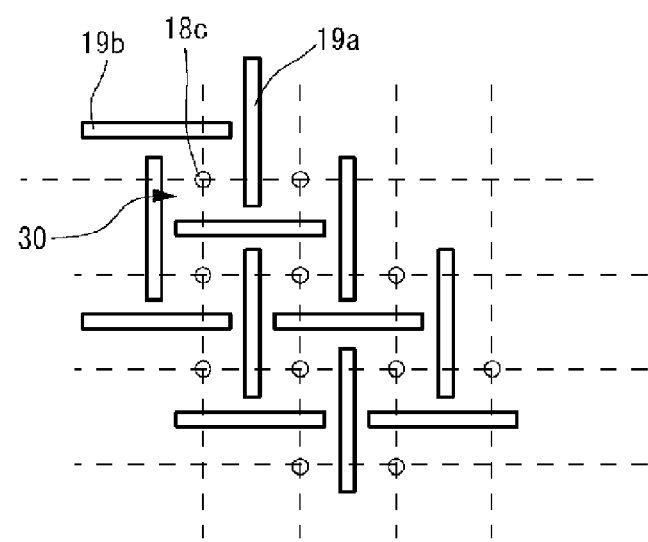

FIG. 7C is an enlarged planar view showing the segment electrode and common electrode superimposed. Further, FIG. 8A and FIG. 8B are planar views respectively showing the disposition of the respective openings with the segment electrode and common electrode superimposed. As shown in each figure, in regions other than the display flaw susceptible regions 120, the respective openings 18a and 18b and the respective openings 19c and 19d overlap, achieving a state in which a plurality of inverted L-shaped openings is continuously disposed in the planar view. On the other hand, in the display flaw susceptible regions 120, one of the respective circular openings 18c of the segment electrode 13 is disposed in the substantial center of a rectangular region 30 surrounded and demarcated by the respective portions of two of the openings 19a and two of the openings 19b among the respective openings 19a and 19b provided to the common electrode 14 in the planar view.

Thus, according to this embodiment, in the regions 120 susceptible to display flaws caused by pattern chipping, a plurality of openings with shapes that differ from those of other regions is disposed. In this case, the respective openings of the segment electrode 13 are preferably smaller than the respective openings of the common electrode 14. Note that while the above presumes that the segment electrode and common electrode overlap without a shift in position, if a position shift is to be considered, the respective openings disposed in the display flaw susceptible regions 120 may be disposed so as to overlap further to the outside than the contours of the regions 120. With this arrangement, it is possible to suppress regions where openings do not exist inside the display design even if a position shift occurs.

Embodiment 2

The following describes an embodiment based on conditions (the length of the respective openings and the like) that differ from those of embodiment 1. Note that the basic structure of the liquid crystal display apparatus is the same as that of embodiment 1 and explanations thereof will be omitted (the same for the other embodiments described later).

Figure 9:
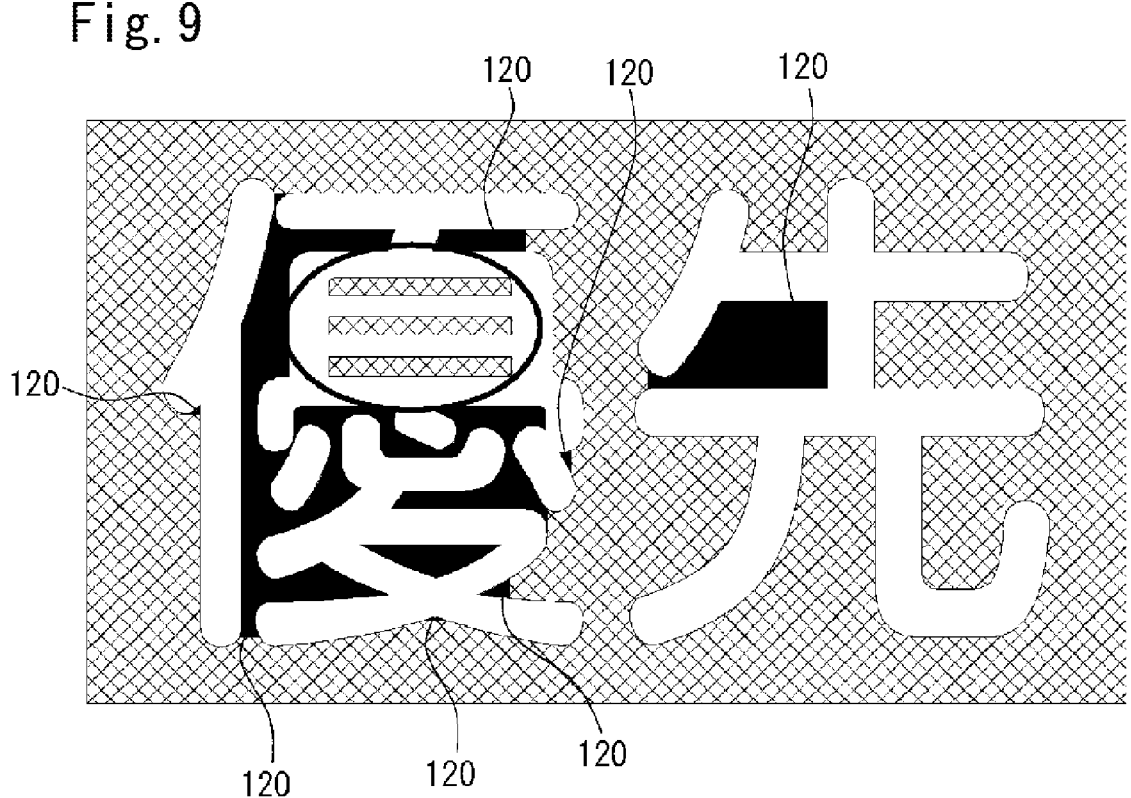
FIG. 9 is a planar view for explaining regions susceptible to display flaws caused by disconnection in the segment electrode.

FIG. 9 is a planar view for explaining regions susceptible to display flaws caused by disconnection in the segment electrode. The display flaw susceptible regions 120 shown here comprise a length that is approximately 1.26 times the longitudinal-direction length (0.126 mm, for example) of the respective openings, from the outermost shell of the respective outline patterns (hollow parts) of the segment electrode 13 toward the inside, and are obtained when a search is conducted from the outermost design shell toward the inside for positions where the distance (that is, electrode width) between the respective outline pattern sections in the up-down/left-right direction parallel with the longitudinal direction of the respective openings is equivalent thereto. Note that the sections shaded with lines are in positions where both electrodes are disposed facing each other, and the outline sections are regions where an outline pattern exists on at least one of the electrodes.

Note that, on the segment electrode 13, the regions indicated by an ellipse are surrounded by outline patterns, but are regions where disconnection does not occur at a length of approximately 1.26 times the respective openings, and therefore are not included in the display flaw susceptible regions 120. Further, while there are regions where outline patterns exist on the common electrode 14 inside the region indicated by the ellipse, in such sections a plurality of circular openings is disposed on the common electrode 14, and thus disconnection never occurs between the outline patterns. Then, since a section that indicates a distance between outline patterns that is approximately 1.26 times the longitudinal-direction length of the respective openings does not exist in other regions on the common electrode 14, the display flaw susceptible regions 120 are set in the same positions as those in the case of the segment electrode 13.

Figure 10A:
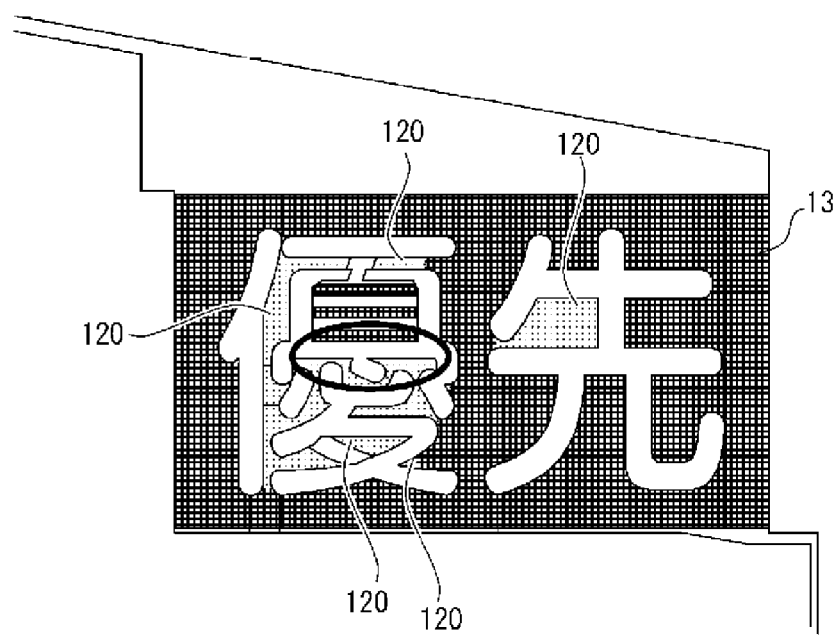
FIG. 10A is a planar view showing the structure of the segment electrode.
Figure 10B:
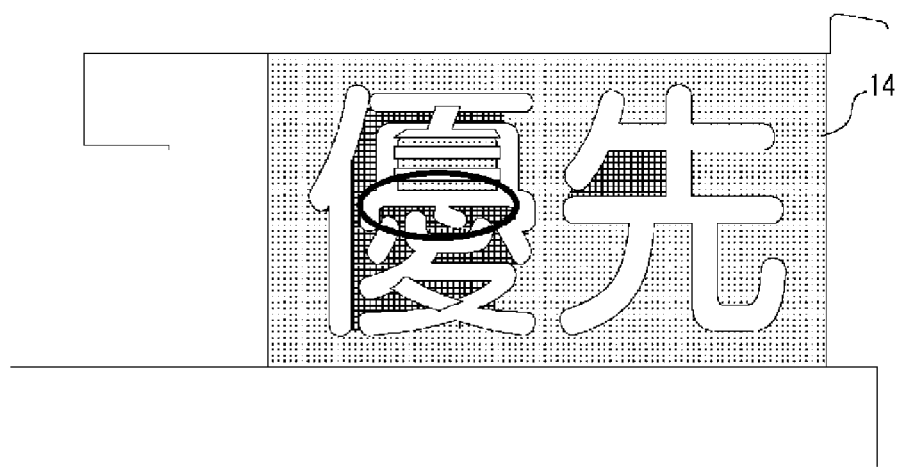
FIG. 10B is a planar view showing the structure of the common electrode.
Figure 11A:
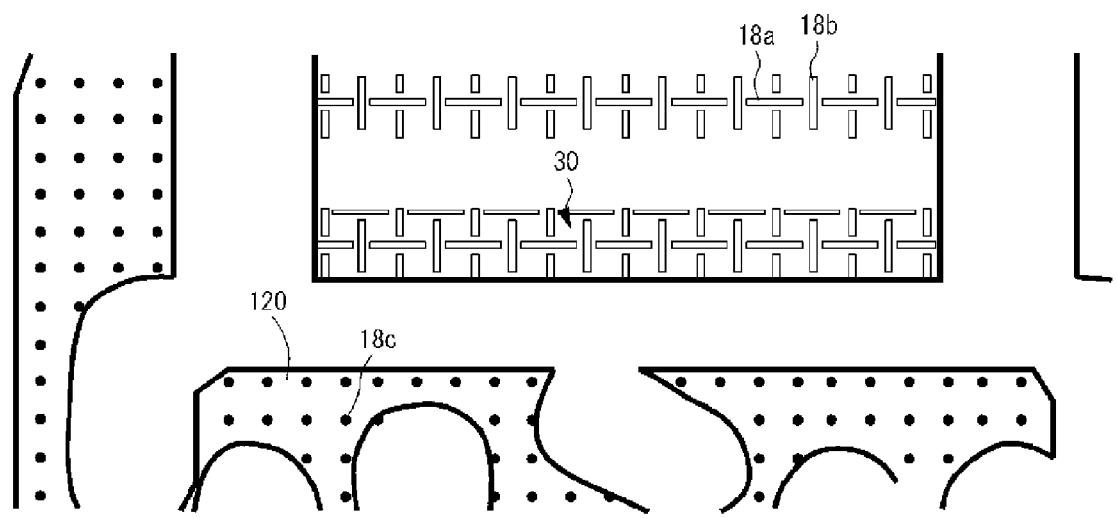
FIG. 11A is an enlarged planar view of the region indicated by an ellipse in FIG. 10A.
Figure 11B:
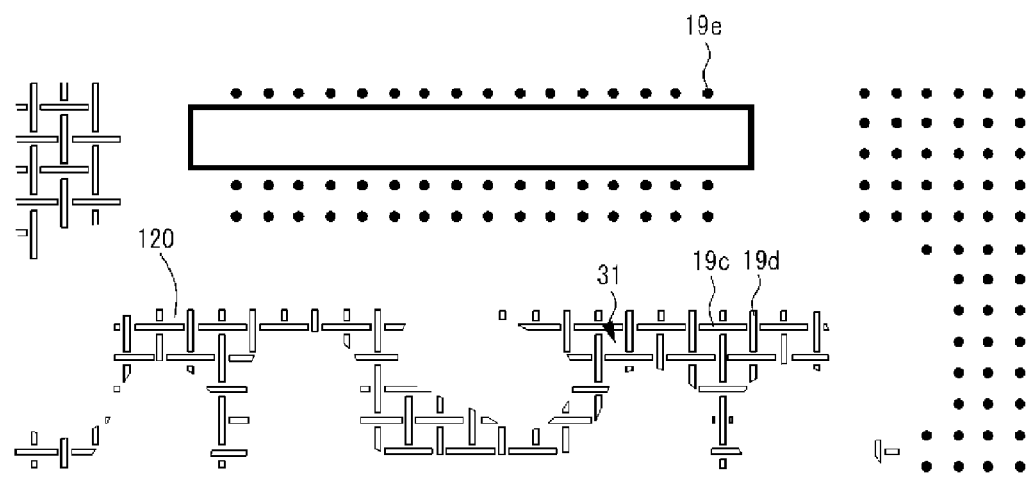
FIG. 11B is an enlarged planar view of the region indicated by an ellipse in FIG. 10B.

FIG. 10A is a planar view showing the structure of the segment electrode. Further, FIG. 11A is an enlarged planar view of the region indicated by an ellipse in FIG. 10A. As shown in the respective figures, a plurality of rectangular openings 18a and 18b is provided to regions other than the display flaw susceptible regions 120 and, in the display flaw susceptible regions 120, a plurality of circular openings 18c is periodically disposed in the respective up-down and left-right directions in the figure in the display flaw susceptible regions 120 instead of the rectangular openings. Note that, among the respective openings 18 provided to the segment electrode 13, the openings with a shape that extends in the direction X in the figure are identified using the reference numeral "18a", the openings with a shape that extends in the Y direction in the figure are identified using the reference numeral "18b", and the circular openings are identified using the reference numeral "18c". FIG. 10B is a planar view showing the structure of the common electrode. Further, FIG. 11B is an enlarged planar view of the region indicated by an ellipse in FIG. 10B. As shown in the respective figures, a plurality of circular openings 19e is provided to regions other than the display flaw susceptible regions 120, and the respective openings 19c and 19d are provided to the display flaw susceptible regions 120.

When the segment electrode and common electrode are superimposed in the planar view, in regions other than the display flaw susceptible regions 120, one of the respective circular openings 19e of the common electrode 14 is disposed in the substantial center of the rectangular region 30 surrounded and demarcated by the respective portions of two of the openings 18a and two of the openings 18b among the respective openings 18a and 18b provided to the segment electrode 13. On the other hand, in the display flaw susceptible regions 120, one of the respective circular openings 18c of the segment electrode 13 is disposed in the substantial center of a rectangular region 31 surrounded and demarcated by the respective portions of two of the openings 19c and two of the openings 19d among the respective openings 19c and 19d provided to the common electrode 14. Note that the respective planar views thereof are the same as those of FIG. 8B described above, and therefore illustrations thereof are omitted.

Thus, according to embodiment 2, the respective openings are switched between the segment electrode and the common electrode in the regions 120 susceptible to display flaws caused by pattern chipping. Originally, the respective openings to be disposed on the common electrode are extremely small compared to the respective openings to be disposed on the segment electrode, and thus pattern chipping does not occur. On the other hand, even if somewhat large openings are disposed on the common electrode, outline patterns where pattern chipping does not occur are formed, and thus pattern chipping does not occur as well. Note that while the above presumes that the segment electrode and common electrode overlap without a shift in position, if a position shift is to be considered, the respective openings disposed in the display flaw susceptible regions 120 may be disposed so as to overlap further to the outside than the contours of the regions 120. With this arrangement, it is possible to suppress regions where openings do not exist inside the display design even if a position shift occurs.

Embodiment 3

Figure 12:
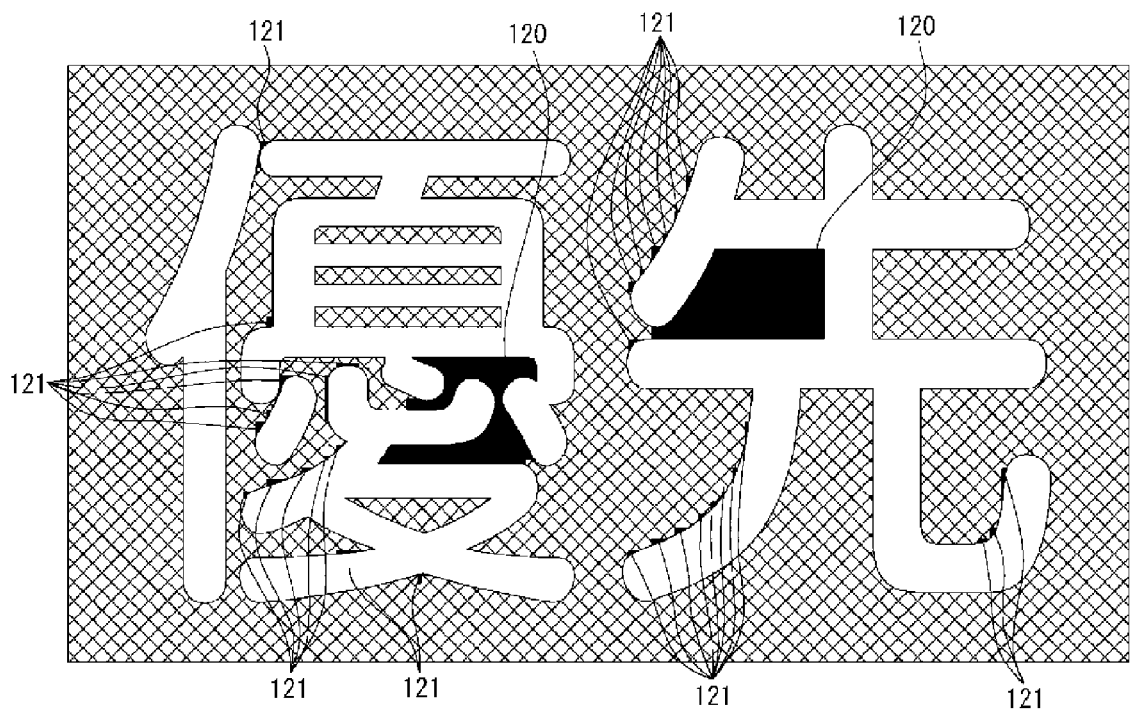
FIG. 12 is a planar view for explaining regions susceptible to display flaws caused by disconnection in the segment electrode.
Figure 13A:
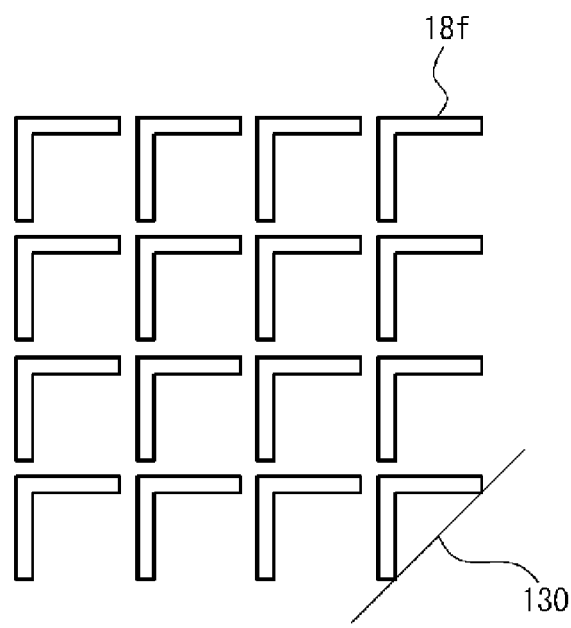
FIGS. 13A and 13B are planar views of the respective openings.

FIG. 12 is a planar view for explaining regions susceptible to display flaws caused by disconnection in the segment electrode. Here is considered a case where a plurality of inverted L-shaped openings 18f, configured so that one end of each of a first branch part and a second branch part that extend in the up-down direction and left-right direction are connected, are regularly disposed on the segment electrode 13, as shown in the planar view of FIG. 13A. The display flaw susceptible regions 120 shown here comprise a length that is approximately 1.22 times each of the longitudinal-direction lengths (0.075 mm, for example) of the first branch part and the second branch part of the respective inverted L-shaped openings, from the outermost shell of the display part design of the segment electrode 13 toward the inside, and are obtained when a search is conducted from the outermost design shell toward the inside for a position where the distance (that is, electrode width) between the respective outline pattern sections in the up-down/left-right direction parallel with the longitudinal direction of each of the first branch part and the second branch part of the respective openings 18f is equivalent thereto. Note that the sections shaded with lines are in positions where both electrodes are disposed facing each other, and the outline sections are regions where an outline pattern exists on at least one of the electrodes.

Figure 14:
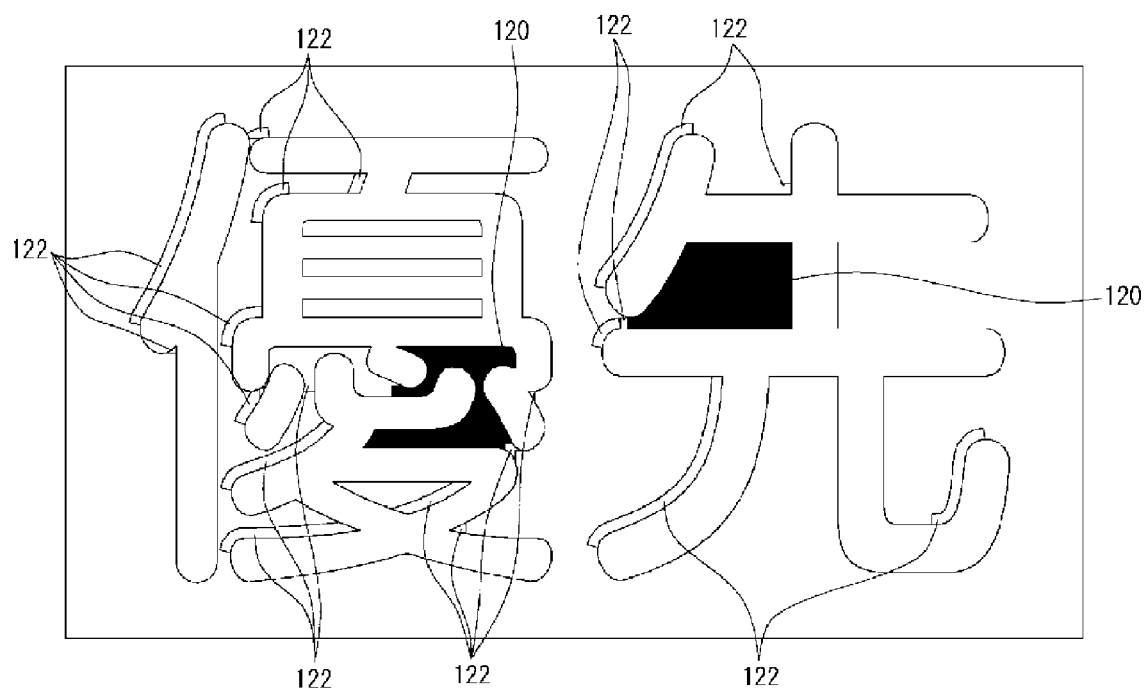
FIG. 14 is a planar view of a plurality of closed regions along portions of the contour of the outline pattern.

Further, according to this embodiment, since the respective openings 18f are an inverted L-shape comprising two branch parts that extend in different directions, in a case where the inclination direction of a virtual line 130 (refer to FIG. 13A) that connects the non-connecting other ends of the first branch part and the second branch part is close to the inclination direction of a contour section of an outline pattern, the openings may connect with a portion of a contour of an outline pattern and cause pattern chipping. Such a region 121 susceptible to flaws in the contour shape exists in a plurality in portions of the contour of the outline pattern, as shown in FIG. 12. The areas in which such the pattern-chipping susceptible region 121 may readily occur are a plurality of closed regions 122 along portions of the contour of the outline pattern, as shown in FIG. 14. These closed regions 122 indicate regions where an edge is offset toward the outside of an outline pattern at a length that is approximately 1.22 times the longitudinal-direction length in the respective left-right and up-down directions of the respective inverted L-shaped openings 18f. In these closed regions 122 as well, it is necessary to ensure that pattern chipping does not occur.

Figure 15A:
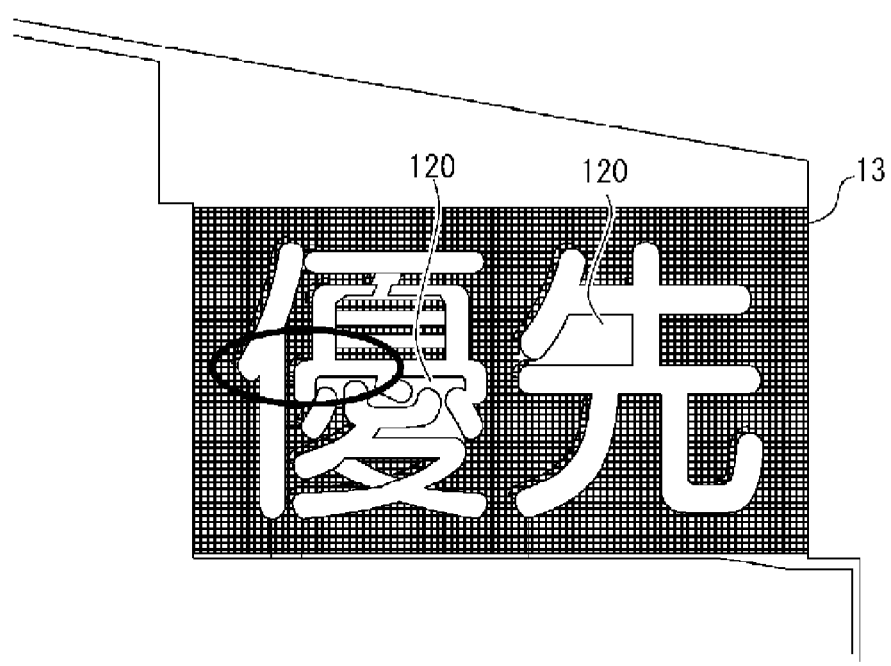
FIG. 15A is a planar view showing the structure of the segment electrode.
Figure 16A:
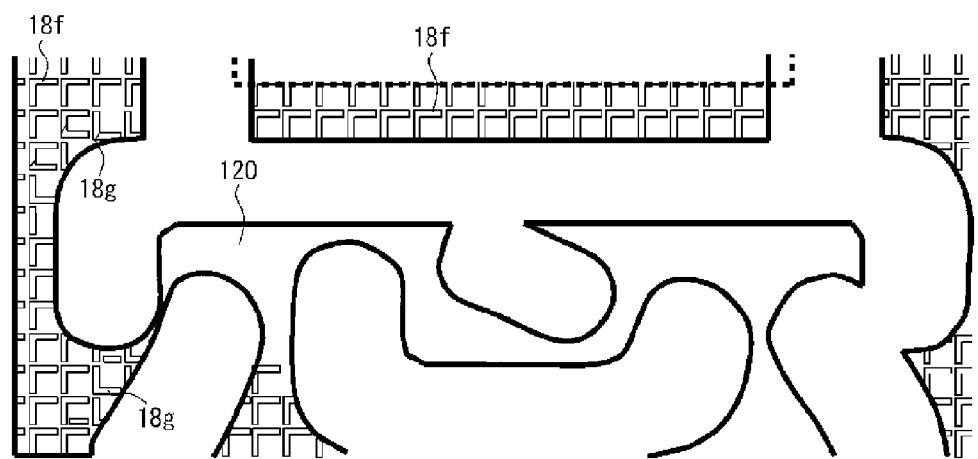
FIG. 16A is an enlarged planar view of the region indicated by an ellipse in FIG. 15A.

FIG. 15A is a planar view showing the structure of the segment electrode. Further, FIG. 16A is an enlarged planar view of the region indicated by an ellipse in FIG. 15A. As shown in the respective figures, a plurality of openings 18f is provided to regions other than the display flaw susceptible regions 120, and openings are not provided to the display flaw susceptible regions 120. Furthermore, a plurality of L-shaped openings 18g is disposed in the respective closed regions 122. With this arrangement, the imaginary line 130 (refer to FIG. 13A) that connects the non-connecting ends of the first branch part and the second branch part, which respectively extend in the left-right and up-down directions, differs from the extending direction of the contour of the outline pattern adjacent thereto, eliminating the occurrence of pattern chipping. Note that, among the respective openings 18 provided to the segment electrode 13, the vertically inverted L-shaped opening is identified here using the reference numeral "18f" and the L-shaped opening (non-vertically-inverted opening) is identified here using the reference numeral "18g".

Figure 13B:
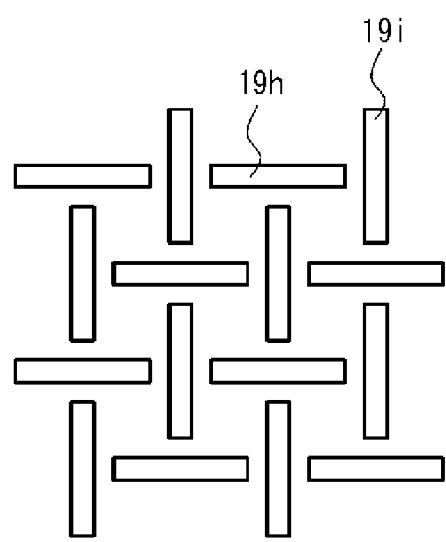
Figure 15B:
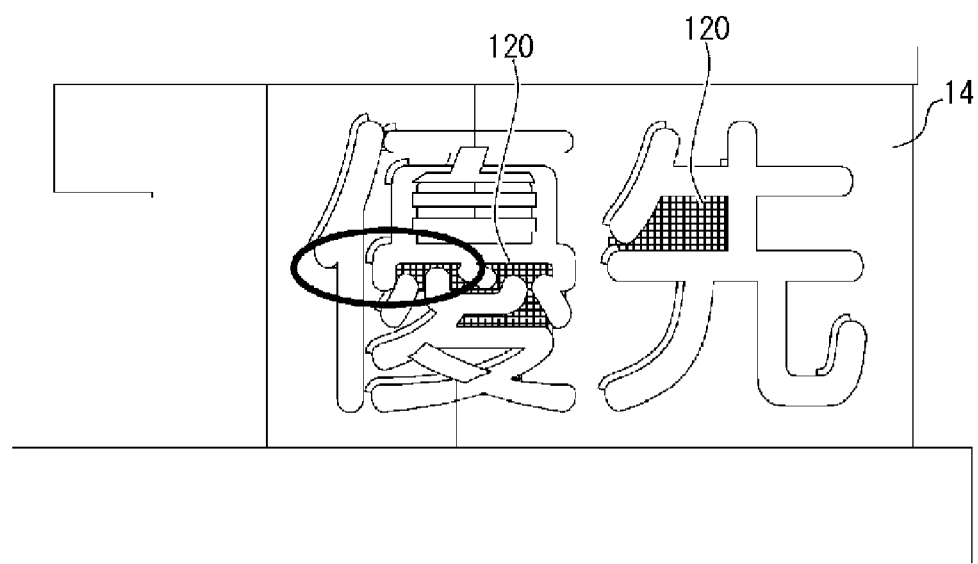
FIG. 15B is a planar view showing the structure of the common electrode.
Figure 16B:
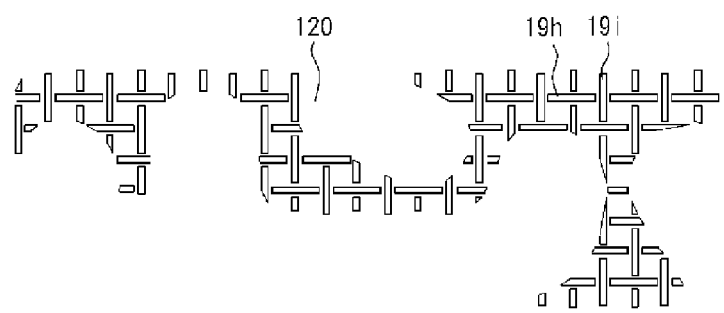
FIG. 16B is an enlarged planar view of the region indicated by an ellipse in FIG. 15B.

FIG. 15B is a planar view showing the structure of the common electrode. Further, FIG. 16B is an enlarged planar view of the region indicated by an ellipse in FIG. 15B. As shown in the respective figures, a plurality of stripe-shaped openings 19h and 19i is provided to the display flaw susceptible regions 120, and openings are not provided to regions other than the display flaw susceptible regions 120. As shown in the planar view of FIG. 13B, the respective openings 19h extend in the left-right direction and are regularly disposed in a checkered pattern, and the respective openings 19i extend in the up-down direction and are regularly disposed in a checkered pattern. Specifically, one of the openings 19h is disposed between two of the openings 19i adjacent in the left-right direction, and one of the openings 19i is disposed between two of the openings 19h adjacent in the up-down direction. Note that while this embodiment describes a case where the respective openings with shapes that differ from those of the segment electrode 13 are provided to the common electrode 14, the shape of the respective openings in both electrodes may be the same.

Figure 16C:
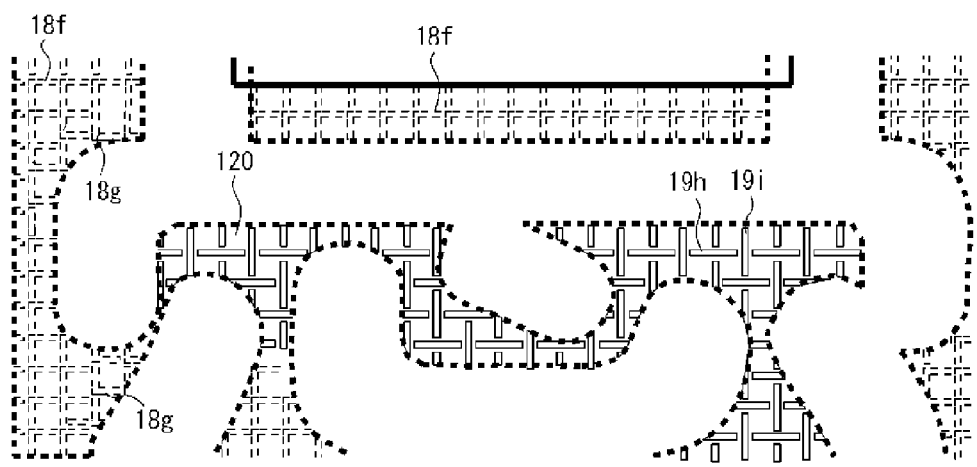
FIG. 16C is an enlarged planar view showing the segment electrode and common electrode superimposed.

FIG. 16C is an enlarged planar view showing the segment electrode and common electrode superimposed. As shown, the respective openings 18f are disposed in regions other than the display flaw susceptible regions 120, the respective openings 18g are disposed in the closed regions 122, and the respective openings 19h and 19i are disposed in the display flaw susceptible regions 120. Note that while the above presumes that the segment electrode and common electrode overlap without a shift in position, if a position shift is to be considered, the respective openings disposed in the display flaw susceptible regions 120 may be disposed so as to overlap further to the outside than the contours of the regions 120. With this arrangement, it is possible to suppress regions where openings do not exist inside the display design even if a position shift occurs.

Embodiment 4

Figure 17:
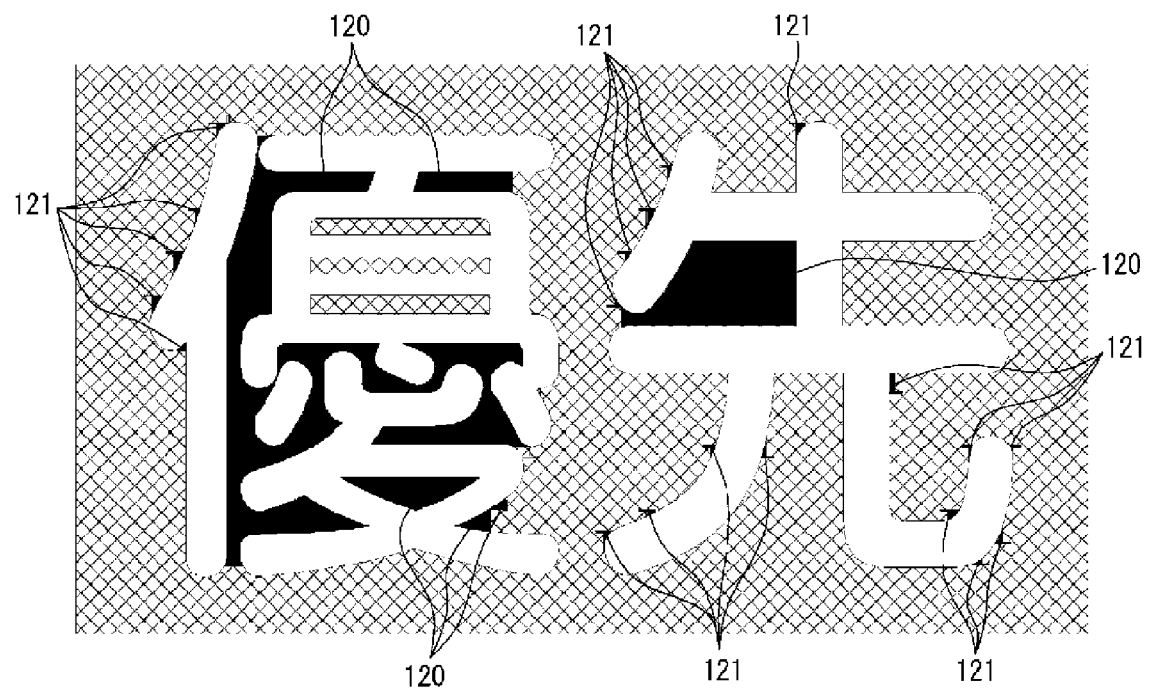
FIG. 17 is a planar view for explaining regions susceptible to display flaws caused by disconnection in the segment electrode.
Figure 18:
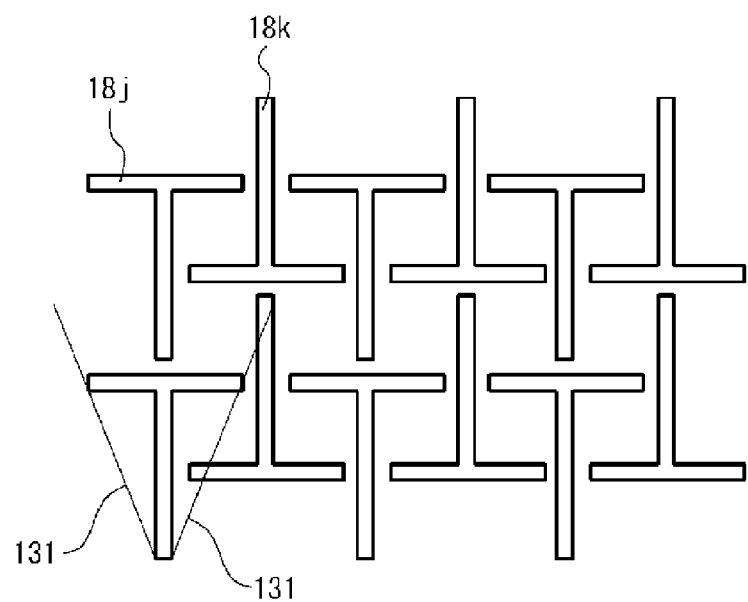
FIGS. 18 is a planar view of the respective openings.

FIG. 17 is a planar view for explaining regions susceptible to display flaws caused by disconnection in the segment electrode. As shown in the plan view of FIG. 18, here is considered a case where a plurality of T-shaped openings 18j and a plurality of inverted T-shaped openings 18k, configured so that one end of each of a first branch part, a second branch part, and a third branch part that extend in the up-down direction, left direction, and right direction are connected, are regularly disposed on the segment electrode 13. Specifically, the respective T-shaped openings 18j and the respective inverted T-shaped openings 18k are each periodically disposed in the up-down direction, and mutually disposed in an offset manner by roughly a half pitch with respect to the up-down direction. Note that, among the respective openings 18 provided to the segment electrode 13, the T-shaped openings are identified here using the reference numeral "18*j*" and the inverted T-shaped openings are identified here using the reference numeral "18*k*". The display flaw susceptible regions 120 shown here comprise a length that is approximately 1.2 times the respective longitudinal-direction lengths (0.131 mm and 0.144 mm, for example) of the first branch part, the second branch part, and the third branch part of the respective T-shaped openings 18*j* and the respective inverted T-shaped openings 18*k*, from the outermost shell of the display part design of the segment electrode 13 toward the inside, and are obtained when a search is conducted from the outermost design shell toward the inside for a position where the distance (that is, electrode width) between the respective outline pattern sections in the up-down/left-right direction parallel with the longitudinal direction of each of the first branch part, the second branch part, and the third branch part of the respective openings is equivalent thereto. Note that the sections shaded with lines are in positions where both electrodes are disposed facing each other, and the outline sections are regions where an outline pattern exists on at least one of the electrodes.

Figure 19:
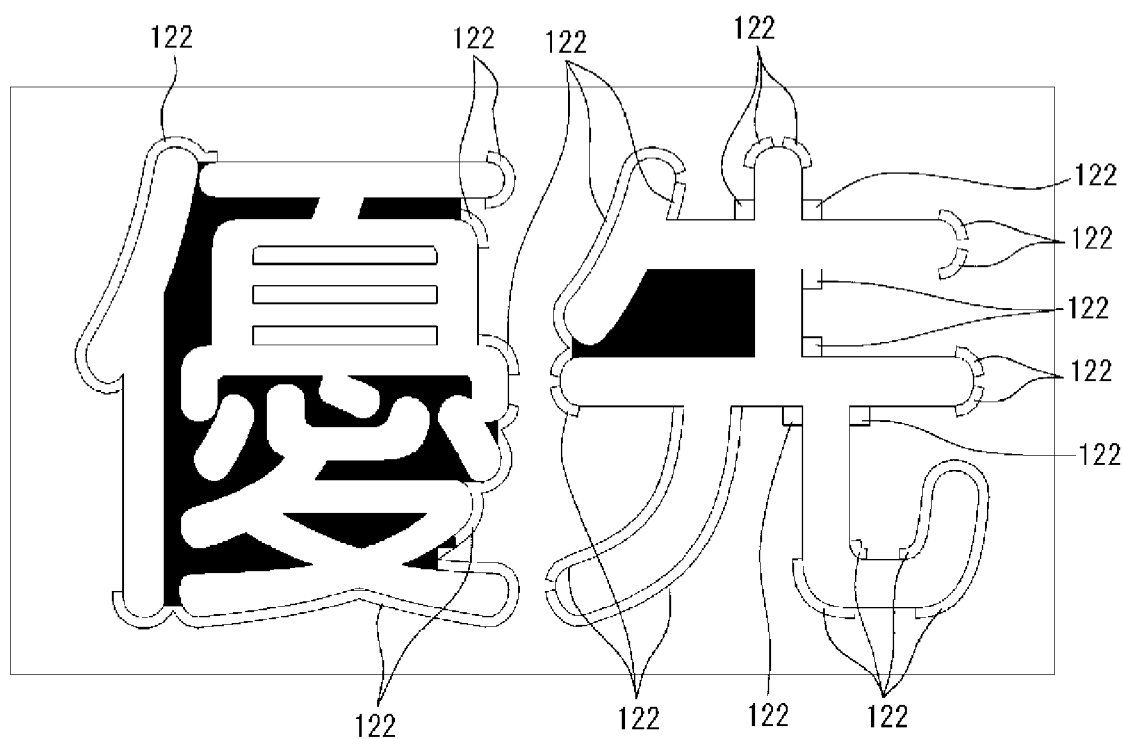
FIG. 19 is a planar view of a plurality of closed regions along portions of the contour of the outline pattern.

Further, according to this embodiment, the respective openings are T-shaped or inverted T-shaped comprising three branch parts that extend in different directions, and thus some of the edges may connect and possibly cause pattern chipping in a case where the inclination direction of the line that connects the non-connecting other ends of the respective branch parts is close to the inclination direction of a contour section of an outline pattern. Such the region 121 susceptible to flaws in the contour shape exists in a plurality in the contour sections of the outline pattern, as shown in FIG. 17. The areas in which such the pattern-chipping susceptible region 121 may readily occur are a plurality of closed regions 122 along portions of the contour of the outline pattern, as shown in FIG. 19. These closed regions 122 indicate regions where an edge is offset to the outside of an outline pattern at a length that is approximately 1.22 times the longitudinal-direction length in the respective left-right and up-down directions of the respective inverted L-shaped openings. These closed regions 122 indicate regions where a contour section is offset to the outside of an outline pattern at a length that is approximately 1.22 times the longitudinal-direction length in the up-down direction of the respective T-shaped opening 18*j* and the respective inverted T-shaped openings 18*k*. In these closed regions 122 as well, a creative approach that ensures that pattern chipping does not occur is necessary.

Figure 20A:
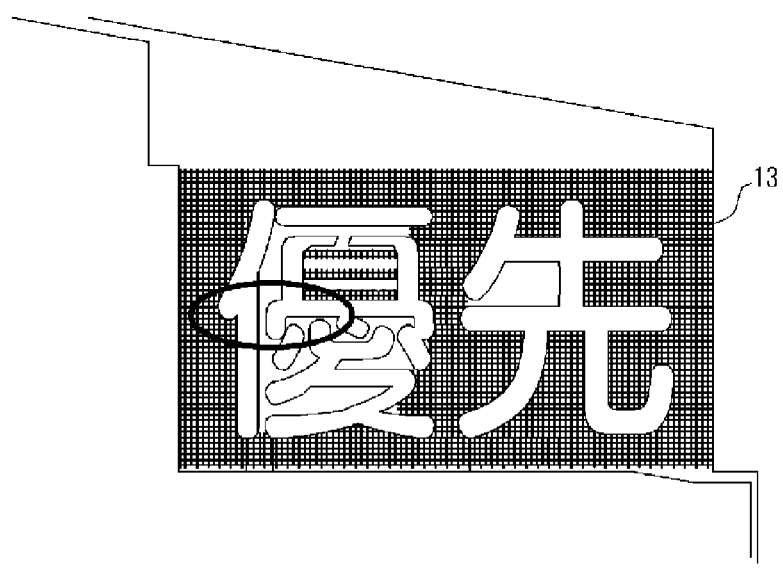
FIG. 20A is a planar view showing the structure of the segment electrode.
Figure 21A:
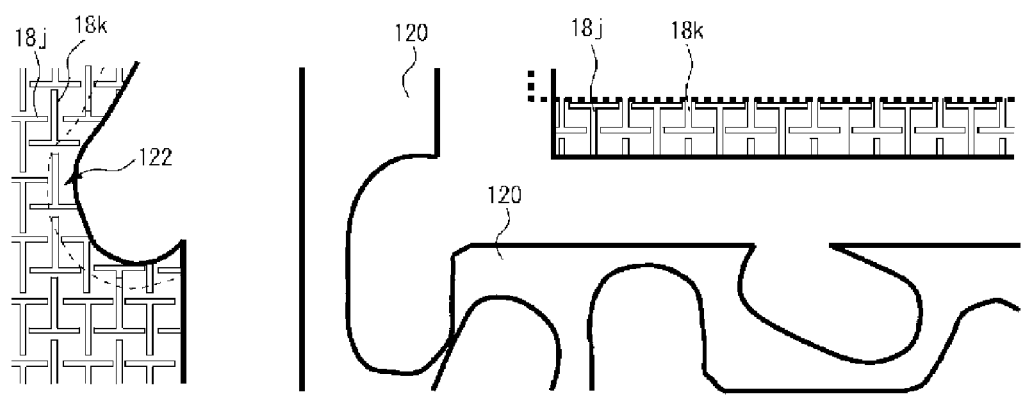
FIG. 21A is an enlarged planar view of the region indicated by an ellipse in FIG. 20A.

FIG. 20A is a planar view showing the structure of the segment electrode. Further, FIG. 21A is an enlarged planar view of the region indicated by an ellipse in FIG. 20A. As shown in the respective figures, a plurality of openings 18*j* and 18*k* is provided to regions other than the display flaw susceptible regions 120, and openings are not provided to the display flaw susceptible regions 120. Furthermore, in the respective closed regions 122, only the respective T-shaped openings 18*j* or the respective inverted T-shaped openings 18*k* are disposed. With this arrangement, an imaginary line 131 that connects the non-connecting ends of the second branch part and the third branch part, which respectively extend in the left-right and up-down directions, and the first branch part that extends in the up-down direction, differs from the extending direction of the contour of the outline pattern adjacent thereto, eliminating the occurrence of pattern chipping.

Figure 20B:
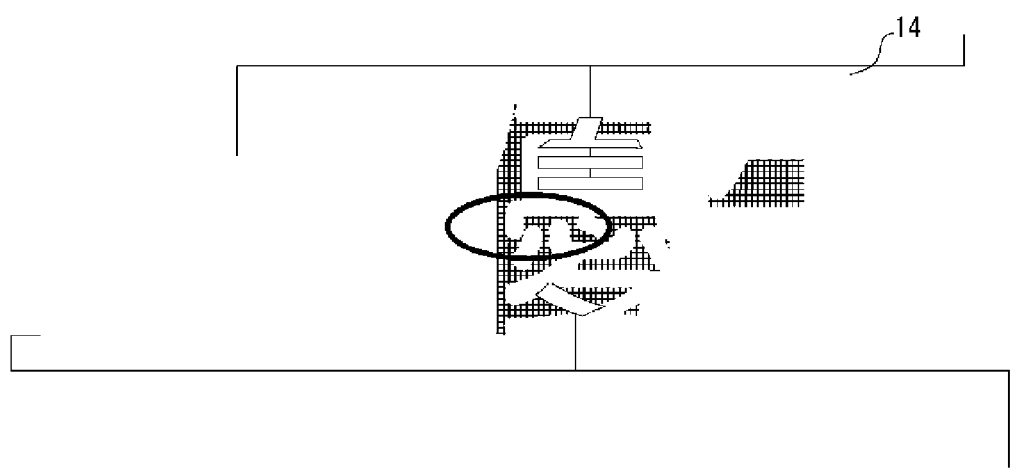
FIG. 20B is a planar view showing the structure of the common electrode.
Figure 21B:
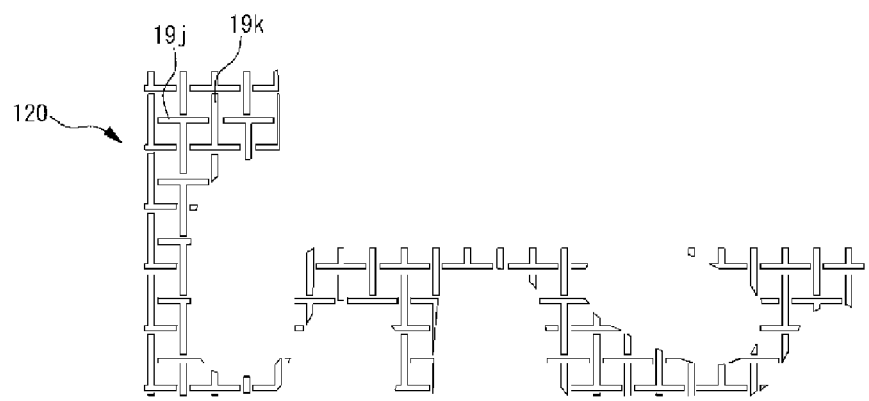
FIG. 21B is an enlarged planar view of the region indicated by an ellipse in FIG. 20B.

FIG. 20B is a planar view showing the structure of the common electrode. Further, FIG. 21B is an enlarged planar view of the region indicated by an ellipse in FIG. 20B. As shown in each figure, a plurality of T-shaped openings 19*j* and a plurality of inverted T-shaped openings 19*k* are provided to the display flaw susceptible regions 120, and openings are not provided to regions other than the display flaw susceptible regions 120. Specifically, one of the openings 19*k* is disposed between two of the openings 19*j* adjacent in the left-right direction, and a plurality of the openings 19*j* and a plurality of the openings 19*k* are respectively disposed in a column in the up-down direction. The shapes and disposed states of the respective openings 19*j* and 19*k* are the same as those of the respective openings 18*j* and 18*k* described above (refer to FIG. 18).

Figure 21C:
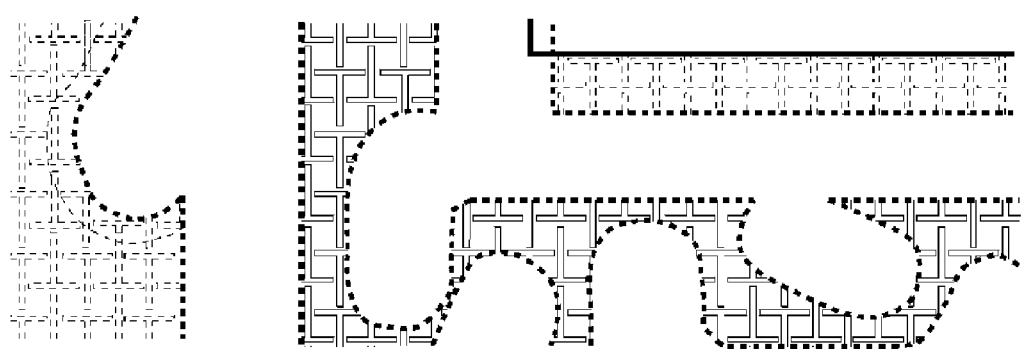
FIG. 21C is an enlarged planar view showing the segment electrode and common electrode superimposed.

FIG. 21C is an enlarged planar view showing the segment electrode and common electrode superimposed. As shown, the respective openings 18*j* and 18*k* are disposed in regions other than the display flaw susceptible regions 120, and the respective openings 19*j* and 19*k* are disposed in the display flaw susceptible regions 120. In the planar view, both are disposed so that they are mutually interpolated. Note that while the above presumes that the segment electrode and common electrode overlap without a shift in position, if a position shift is to be considered, the respective openings disposed in the display flaw susceptible regions 120 may be disposed so as to overlap further to the outside than the contours of the regions 120. With this arrangement, it is possible to suppress regions where openings do not exist inside the display design even if a position shift occurs.

Note that this invention is not limited to the subject matter of the foregoing embodiments, and can be implemented by being variously modified within the scope of the gist of the present invention. For example, while each of the embodiments described above sets the distance between outline patterns that is highly susceptible to disconnection based on various conditions, the distance may be set to about 1-1.5 times the longitudinal-direction length of the respectively disposed openings. Further, while in the above a plurality of openings with a short longitudinal-direction length and the same shape as those in regions other than the interior of pattern chipping susceptible regions may be disposed in the interior of pattern chipping susceptible sections as well, there is a high possibility that, in such a case, the regions will become darker in outer appearance due to a decrease in aperture ratio. Thus, preferably, a plurality of openings with the same shape is disposed on different electrode surfaces, or a plurality of openings with different shapes is disposed and the transmittance is adjusted. Further, the initial orientation state of the liquid crystal layer is not limited to a vertical orientation.

What is claimed is:

1. A segment display-type liquid crystal display apparatus that displays a predetermined pattern, comprising:
   a first electrode and a second electrode disposed so that at least a portion of each overlaps in the planar view, and
   a liquid crystal layer disposed between the first electrode and the second electrode,
   wherein the first electrode comprises one or more hollow parts open in accordance with a pattern shape, and a plurality of first openings, each having at least a first area that extends in a first direction,
   the region where the first electrode and the second electrode overlap is divided into a first region demarcated by at least a portion of a contour of a hollow part and a first boundary part wherein the distance in the first direction between contours of a hollow part is 1.5 times or less the length of the first area, and a second region other than the first region, and
   the plurality of first openings is disposed correspondingly in the first region and not disposed in the second region.

2. The liquid crystal display apparatus according to claim 1,
wherein the first electrode further comprises a plurality of second openings, each having at least a second area that extends in a second direction that crosses the first direction;
the first region is demarcated by a first boundary part and a second boundary part wherein the distance in the second direction between contours of a hollow part is 1.5 times or less the length of the second area, and at least a portion of a contour of a hollow part;
and the plurality of second openings is disposed correspondingly in the first region and not disposed in the second region.

3. The liquid crystal display apparatus according to claim 1,
wherein the second electrode comprises a plurality of third openings;
and said plurality of third openings is correspondingly disposed in the second region and not disposed in the first region.

4. The liquid crystal display apparatus according to claim 2,
wherein the second electrode comprises a plurality of third openings;
and said plurality of third openings is correspondingly disposed in the second region and not disposed in the first region.

5. The liquid crystal display apparatus according to claim 1,
wherein the plurality of third openings has the same shape as that of the plurality of first openings or the plurality of second openings.

6. The liquid crystal display apparatus according to claim 2,
wherein the plurality of third openings has the same shape as that of the plurality of first openings or the plurality of second openings.

7. The liquid crystal display apparatus according to claim 3,
wherein the plurality of third openings has the same shape as that of the plurality of first openings or the plurality of second openings.

8. The liquid crystal display apparatus according to claim 4,
wherein the plurality of third openings has the same shape as that of the plurality of first openings or the plurality of second openings.

9. The liquid crystal display apparatus according to claim 1,
wherein the first electrode further comprises a plurality of fourth openings, each with a length in the first direction that is shorter than that of the first area;
and said plurality of fourth openings is correspondingly disposed in the first region and not disposed in the second region.

10. The liquid crystal display apparatus according to claim 2,
wherein the first electrode further comprises a plurality of fourth openings, each with a length in the first direction that is shorter than that of the first area;
and said plurality of fourth openings is correspondingly disposed in the first region and not disposed in the second region.

11. The liquid crystal display apparatus according to claim 3,
wherein the first electrode further comprises a plurality of fourth openings, each with a length in the first direction that is shorter than that of the first area;
and said plurality of fourth openings is correspondingly disposed in the first region and not disposed in the second region.

12. The liquid crystal display apparatus according to claim 4,
wherein the first electrode further comprises a plurality of fourth openings, each with a length in the first direction that is shorter than that of the first area;
and said plurality of fourth openings is correspondingly disposed in the first region and not disposed in the second region.

* * * * *